Patented Sept. 15, 1953

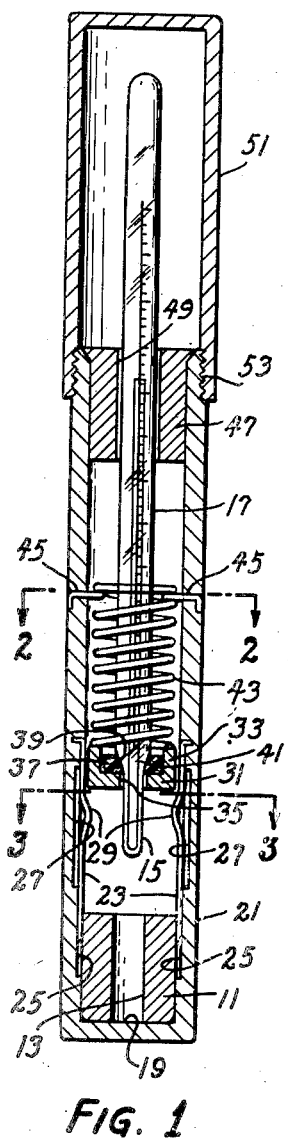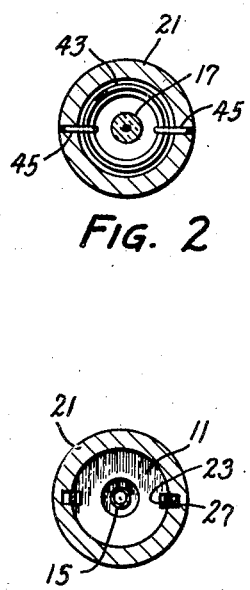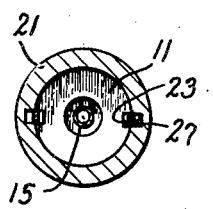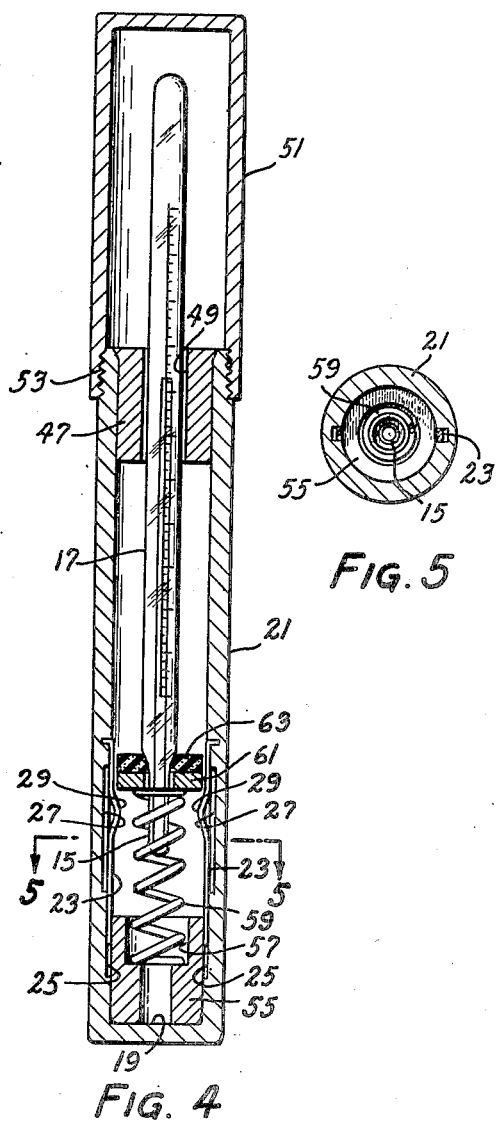

2,651,943

UNITED STATES PATENT OFFICE 2,651,943

RESETTING DEVICE FOR CLINICAL THERMOMETERS

William Edward McCormick, New York, N. Y.

Application June 26, 1951, Serial No. 233,671

13 Claims. (Cl. 73—373)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in thermometer shakers, and more particularly pertains to improvements in devices for returning the mercury or other expanding fluid of a thermometer to a normal level.

In hospitals, homes or laboratories, when a clinical thermometer has been used to take a temperature reading, the mercury or other temperature indicating means in the thermometer normally has reached a level higher than the usual initial level. After disinfecting but before the thermometer can be used again, it is necessary for the user to return the mercury or other medium to the usual initial level. This has been accomplished in the past by shaking the thermometer vigorously, or by whirling the thermometer to provide a centrifuging effect.

Such methods are subject to many disadvantages. The shaking action is annoying and tedious. In some instances the shaking has not been sufficient to return the mercury in the thermometer to normal level so that improper subsequent readings result. Often such shaking results in the thermometer slipping out of the hand or striking an object and being broken. Finally, personnel required to take a great number of thermometer readings daily develop orthopaedic malformations and consequent pain and suffering at the carpal region.

The subject device provides means to return the mercury or other fluid in a clinical thermometer to normal level safely, accurately, readily and facilely, such means overcoming the disadvantages above described and also providing a housing for storage of the thermometer.

The principal object of this invention is to provide a thermometer housing adapted to return the mercury or other fluid of a clinical thermometer inserted therein to normal level.

Another object is to provide a device of the character described that is inexpensive to manufacture and is safe, accurate, ready and facile in use.

A further object is to provide a device of the character described that eliminates the need for shaking or whirling a thermometer for reset thereof and thereby avoids the annoying, tedious, material- and personnel-injurious practices required in the past.

Other objects and many of the attendant advantages of this invention will be readily appreciated as the same becomes better understood by reference to the following detailed description when considered in connection with the accompanying drawing wherein:

Fig. 1 is a longitudinal cross-section of a clinical thermometer housing and a clinical thermometer seated therein, showing a preferred embodiment of the invention;

Fig. 2 is a section taken on the line 2—2 of Fig. 1;

Fig. 3 is a section taken on the line 3—3 of Fig. 1;

Fig. 4 is a longitudinal cross-section of a clinical thermometer housing and a clinical thermometer seated therein, showing a modified form of the invention; and Fig. 5 is a section taken on the line 5—5 of Fig. 4.

Similar numerals refer to similar parts throughout the several views.

An annulus, an anvil 11 having a central bore 13 of sufficient diameter to receive the bulb portion 15 of a conventional clinical thermometer 17, is seated on the interior base 19 of a tubular casing or housing 21.

Leaf springs 23, which are preferably positioned oppositely, each have one end secured in the interior wall of said housing and depend into slots 25 in said housing, said slots 25 extending along a portion of the anvil 11 so that said anvil and said slots serve as a guide during movement of said springs in the manner hereinafter described. Slots 27 in said housing parallel the inwardly protuberant portion 29 of each of said springs 23 to permit deflection of said portion outwardly in the manner hereinafter described.

Hammer 31 is a disc having a peripheral upstanding flange 33 and a central bore 35 of sufficient diameter to pass the bulb portion 15 of said thermometer. A shock absorber 37 made of a suitable resilient material such as rubber is seated on said hammer 31 and is provided with a central bore 39 that conforms to the shape of the tapered neck portion 41 of said thermometer.

Return spring 43 is an expansion spring secured to the flange 33 as by welding and positioned in said housing 21 by pins 45. Plug 47 is secured in the upper end of said housing and is provided with a central bore 49 adapted to pass and to serve as a guide for the thermometer 17. A tubular cap 51 is secured removably to said housing, as by mating threads 53.

The elements are so proportioned that, when hammer 31 is resting against the protuberant portions 29 of the leaf springs 23, a portion of the thermometer 17 extends beyond the plug 47, and so that a portion of said thermometer extends beyond said plug when the thermometer is injected fully into the housing in the manner hereinafter described.

In operation, the thermometer that is to be reset to a normal level reading is inserted, bulb end first, through guide bore 49 and bore 35. By continuing thrust in that direction, hammer 31 is forced past protuberant portions 29, said portions 29 being forced outwardly into slots 27 and downwardly in slots 25. When the hammer 31 clears said protuberant portions, the downward thrust causes the hammer to strike anvil 11 sharply, thereby restoring the fluid in the thermometer to a normal level reading in a single stroke. (Where restoration from a comparatively high reading of the thermometer is required, one or more additional strokes may be necessary. It has been found in practice, however, that reset from average readings can be effected by a single stroke by adoption of suitable values for the length of stroke and the force of springs 23.) Upon completion of the thrust stroke, the thermometer is released by the operator and is restored to the position shown in Fig. 1 by return spring 43. Cap 51 can then be affixed for purposes of sterile and safe storage.

In an alternative embodiment of the invention shown in Figs. 4 and 5, the anvil 55 is provided with a counterbore 57 in which is seated a compression type spring 59. Said spring 59 is secured to a disc hammer 61 as by welding, and a disc shock absorber 63 is seated upon said hammer. In operation, the thermometer is inserted and thrust through bore 49 and the bores in said shock absorber and said hammer. Upon continued thrust, the hammer 61 is forced past protuberant portions 29 of springs 23. When said hammer has cleared said portions, spring 59 is compressed and hammer 61 rapped against anvil 55 sharply, thereby restoring the fluid level in the thermometer to the desired normal value. Upon release of the thermometer by the operator, the spring 59 forces hammer 61 upwardly past the protuberant portions 29 to the position shown in Fig. 4, where a second stroke can be initiated or the cap 51 can be applied for purposes of sterile and safe storage.

Obviously many modifications and variations of the present invention are possible in the light of the above teachings. It is therefore to be understood that within the scope of the appended claims the invention may be practiced otherwise than as specifically described.

I claim:

1. A containing and resetting device for a clinical thermometer comprising a casing, an anvil mounted in said casing, a hammer carried slidably in said casing, a spring having an inwardly protuberant portion carried by said casing to retain said hammer spaced from said anvil, said hammer being engageable by a thermometer to be thrust thereby past said spring to strike said anvil, and means to restore said hammer to said retained position.

2. A containing and resetting device for a clinical thermometer comprising a casing, an anvil mounted on the interior base of said casing, a hammer carried slidably in said casing, a pair of springs having inwardly protuberant portions carried by said casing to retain said hammer spaced from said anvil, said protuberant portions being positioned oppositely and being recessible in slots in the interior wall of said casing, said hammer being engageable by a thermometer to be thrust thereby to recess said portions in said slots and strike said anvil, and means to restore said hammer to said retained position.

3. A containing and resetting device for a clinical thermometer comprising a casing, an anvil mounted on the interior base of said casing, a hammer carried slidably in said casing, a pair of springs having inwardly protuberant portions carried by said casing to retain said hammer spaced from said anvil, said protuberant portions being positioned oppositely and being recessible in slots in the interior wall of said casing, said hammer being engageable by a thermometer to be thrust thereby to recess said portions in said slots and strike said anvil, and a spring secured to said hammer and to a fixed element of the device, said spring being adapted to restore said hammer to said retained position upon release of the thermometer.

4. A containing and resetting device for a clinical thermometer comprising a tubular casing, an anvil having a bore adapted to receive the bulb portion of a thermometer mounted on the interior base of said casing, a disc hammer having a bore adapted to pass the bulb portion only of a thermometer, said hammer being carried slidably in said casing, a pair of springs having inwardly protuberant portions carried by said casing to retain said hammer spaced from said anvil, said protuberant portions being positioned oppositely and being recessible in slots in the interior wall of said casing, whereby a thermometer is adapted to thrust said hammer to recess said portions in said slots and strike said hammer against said anvil, and a spring secured to said hammer and to a fixed element of the device, said spring being adapted to restore said hammer to said retained position upon release of the thermometer.

5. A containing and resetting device for a clinical thermometer comprising a tubular casing, an anvil having a bore adapted to receive the bulb portion of a thermometer mounted on the interior base of said casing, a disc hammer having a bore adapted to pass the bulb portion only of a thermometer, said hammer being carried slidably in said casing, a pair of springs having inwardly protuberant portions carried by said casing to retain said hammer spaced from said anvil, said protuberant portions being positioned oppositely and being recessible in slots in the interior wall of said casing, whereby a thermometer is adapted to thrust said hammer to recess said portions in said slots and strike said hammer against said anvil, and a spring secured to said hammer and to a fixed element of the device, said spring being adapted to restore said hammer to said retained position upon release of the thermometer, and means carried by said casing to guide such thermometer during such thrust.

6. A containing and resetting device for a clinical thermometer comprising a tubular casing, an anvil having a bore adapted to receive the bulb portion of a thermometer mounted on the interior base of said casing, a disc hammer having a bore adapted to pass the bulb portion only of a thermometer, said hammer being carried slidably in said casing, a pair of springs having inwardly protuberant portions carried by said casing to retain said hammer spaced from said anvil, said protuberant portions being positioned oppositely and being recessible in slots in the interior wall of said casing, whereby a thermometer is adapted to thrust said hammer to recess said portions in said slots and strike said hammer against an anvil, and a spring secured to said hammer and to a fixed element of the device, said spring being adapted to restore said hammer to said retained position upon release of the thermometer, and a plug carried at the mouth of said casing, said plug having a guide bore adapted to pass the body of such thermometer and to maintain such thermometer on the axis of said hammer and anvil bores.

7. A containing and resetting device for a clinical thermometer comprising a tubular casing, an anvil having a bore adapted to receive the bulb portion of a thermometer mounted on the interior base of said casing, a disc hammer having a bore adapted to pass the bulb portion only of a thermometer, said hammer being carried slidably in said casing, a shock absorber element seated on said hammer, said element having a seat for the tapered neck of a thermometer aligned with said hammer bore, a pair of springs having inwardly protuberant portions carried by said casing to retain said hammer spaced from said anvil, said protuberant portions being positioned oppositely and being recessible in slots in the interior wall of said casing, said hammer being engageable by a thermometer to be thrust thereby to recess said portions in said slots and strike said anvil, an extension spring secured to said hammer and to the wall of said casing, said spring being adapted to restore said hammer to said retained position upon release of the thermometer, and a plug carried at the mouth of said casing, said plug having a guide bore adapted to pass the body of such thermometer and to maintain such thermometer on the axis of such shock absorber seat and said hammer and anvil bores.

8. A containing and resetting device for a clinical thermometer comprising a tubular casing, an anvil having a bore adapted to receive the bulb portion of a thermometer, and having a counterbore, said anvil being mounted on the interior base of said casing, a disc hammer having a bore adapted to pass the bulb portion only of a thermometer, said hammer being carried slidably in said casing, a shock-absorber element seated on said hammer, said element having a seat for the tapered neck of a thermometer aligned with said hammer bore, a pair of springs having inwardly protuberant portions carried by said casing to retain said hammer spaced from said anvil, said protuberant portions being positioned oppositely and being recessible in slots in the interior wall of said casing, said hammer being engageable by a thermometer to be thrust thereby to recess said portions in said slots and strike said anvil, a compression spring seated in said counterbore and bearing against the nether face of said hammer, said spring being adapted to restore said hammer to said retained position upon release of the thermometer, and a plug carried at the mouth of said casing, said plug having a guide bore adapted to pass the body of such thermometer and to maintain such thermometer on the axis of said shock-absorber seat and said hammer and anvil bores.

9. A containing and resetting device for a clinical thermometer comprising a base having an opening therein adapted to receive the bulb of a clinical thermometer, a pair of opposed release springs extending away from said base each having a portion bent in toward the other, an annulus retained between said release springs and adapted to receive therethrough the bulb but not the body of a clinical thermometer, a return spring attached to said annulus and adapted normally to retain said annulus on the side of said portions distal from said base and adapted to be stretched to permit said annulus to be snapped past said portions to and against said base and to return the annulus, and a thermometer therein, back to the normal position when pressure on the thermometer is released, and a casing enclosing said base annulus and springs and large enough to contain a clinical thermometer.

10. A thermometer device comprising a casing element, an anvil mounted on said casing element, a hammer element slidable on said casing element, spring means on one of said elements to retain said hammer element spaced from said anvil, said hammer element being engageable by a thermometer to be thrust thereby past said spring means to strike said anvil, and means to restore said hammer element to said retained position.

11. A thermometer device comprising a support element, an anvil mounted on said support element, a hammer element slidable on said support element, friction means on one of said elements to retain said hammer element spaced from said anvil, said hammer element being engageable by a thermometer to be thrust thereby past said friction means to strike said anvil, and means to restore said hammer element to said retained position.

12. A thermometer device comprising a casing element, an anvil mounted on said casing element, a hammer element slidable on said casing element, and spring means on one of said elements to retain said hammer element spaced from said anvil, said hammer element being engageable by a thermometer to be thrust thereby past said spring means to strike said anvil.

13. A thermometer device comprising a support element, an anvil mounted on said support element, a hammer element slidable on said support element, and friction means on one of said elements to retain said hammer element spaced from said anvil, said hammer element being engageable by a thermometer to be thrust thereby past said friction means to strike said anvil.

WILLIAM EDWARD McCORMICK.

No references cited.